United States Patent [19]

Shaw

[11] 4,104,095
[45] Aug. 1, 1978

[54] METHOD FOR PRODUCING TUBULAR ARTICLE

[76] Inventor: William D. Shaw, 4494 Orchard St., Mantua, Ohio 44255

[21] Appl. No.: 742,694

[22] Filed: Nov. 17, 1976

[51] Int. Cl.$^2$ ............................................. B32B 31/26
[52] U.S. Cl. ............................................. 156/83; 156/82; 156/149; 156/172; 156/244.13; 138/125; 138/132; 138/144; 138/174; 138/DIG. 2; 138/DIG. 3
[58] Field of Search ............... 156/82, 83, 86, 143, 156/144, 149, 172, 187, 294, 429, 499, 244; 138/125, 129, 132, 141, 144, 147, 174, DIG. 2, DIG. 3

[56] References Cited

U.S. PATENT DOCUMENTS

| | | | |
|---|---|---|---|
| 2,685,707 | 8/1954 | Llewellyn et al. | 138/DIG. 3 |
| 2,700,631 | 1/1955 | Ferguson et al. | 156/82 |
| 2,783,173 | 2/1957 | Walker et al. | 138/DIG. 3 |
| 2,810,424 | 10/1957 | Swartswelter et al. | 156/149 |
| 2,888,042 | 5/1959 | St. John et al. | 138/132 |
| 2,888,954 | 6/1959 | Gates | 156/149 |
| 3,023,787 | 3/1962 | Phillips et al. | 156/149 |
| 3,368,017 | 2/1968 | Lister | 156/149 |
| 3,776,794 | 12/1973 | Ingham | 156/143 |

FOREIGN PATENT DOCUMENTS 674,698  6/1952  United Kingdom ..................... 156/149

Primary Examiner—Caleb Weston
Attorney, Agent, or Firm—McNenny, Pearne, Gordon, Gail, Dickinson & Schiller

[57] ABSTRACT

A method and apparatus are disclosed for producing a composite pipe for handling destructive materials under pressure and vacuum conditions. The pipe includes a tubular liner formed of thermoplastic material capable of withstanding the destructive material. A strip of glass fiber fabric is helically wrapped around the outer surface of the liner. Heat is applied externally to the wrapped liner at a sufficient rate to simultaneously melt the exterior surface of the liner and thermally expand the liner radially outwardly into the openings in the fabric. Upon cooling, a permanent mechanical bond is achieved between the liner and the fabric. A layer of fiber glass and resin is then applied to the outer surface of the wrapped liner for structional rigidity and strength.

11 Claims, 5 Drawing Figures

METHOD FOR PRODUCING TUBULAR ARTICLE

BACKGROUND OF THE INVENTION

This invention relates to a method and apparatus for producing equipment for handling destructive materials such as corrosive or caustic or abrasive materials. More particularly, the invention relates to a method and apparatus for producing equipment which combines a lining or barrier material having physical properties permitting it to be exposed to the destructive material and an exterior fiber glass layer to provide rigidity and strength.

Equipment for handling caustic or corrosive or abrasive materials often includes a lining or barrier formed of thermoplastic material which is encased within fiber glass or other structural material. The lining or barrier is selected to provide physical properties which can withstand the particular destructive material involved. However, the lining material often requires an encasing structure such as metal or fiber glass for structural strength and rigidity.

In such equipment it is desirable to provide a good bond between the lining and the reinforcing layer. This bond is particularly important when the equipment is exposed to vacuum which tends to cause the liner to collapse inwardly away from the reinforcing layer. The establishment of a bond is, however, difficult with certain types of thermoplastic materials. For example, the material sold under the trademark Teflon does not readily bond with bonding agents.

In the past it has been known to laminate sheets of Teflon with a glass fiber cloth or fabric by the use of heat and externally applied pressure. Such lamination, when properly performed, produces a mechanical interlocking bond between the cloth fibers and the surface of the Teflon without a chemical bonding agent. In use this laminate is often rolled to form tubes and the Teflon is welded along its longitudinal seam to provide a welded tube structure. Subsequently, the tube is encased in fiber glass which bonds with the cloth of the laminate.

The fabrication of various types of equipment for destructive materials in this manner must be very carefully accomplished. In practice it is customary to perform more than one welding operation along the seam to insure that a completely reliable weld is produced. It is also usual practice to trim the welds and to weld on additional laminate across the weld zone to provide a continuity of the cloth in the area of the weld.

Other prior art is disclosed in Japanese patent application No. 40,913 published Dec. 3, 1973, and in U.S. Pat. Nos. 2,700,631; 3,210,227; 3,325,332; 3,531,357; 3,740,291; 3,776,794; 3,802,908; 3,873,396; 3,905,853; and 3,945,867.

SUMMARY OF THE INVENTION

In accordance with the present invention an improved product can be produced without welds in which a glass fiber cloth encloses a lining material without objectionable seams or the like so that a homogeneous lining structure and glass fiber structure is produced in which a good mechanical bond is established between the glass fibers and the surface of the lining material. Subsequently, the article is enclosed or encased within a layer of reinforcing fiber glass which bonds to the glass cloth at the surface of the lining material and is, in turn, bonded therethrough to the lining material.

An extruded tube of thermoplastic lining material such as Teflon is helically wrapped with a strip of cloth of glass fibers. The wrapped tube is then subjected to localized heat as the tube is rotated causing the outer surface of the lining material to be melted. The heat also causes differential expansion of the lining material and of the cloth wrapping which produces sufficient pressure between the surface of the lining material and the cloth to produce radially outward flow of the softened lining material into the fabric or cloth until the cloth fibers are partially embedded. Upon cooling, a tubular structure results in which the lining material is well bonded to the cloth wrapping but the cloth wrapping is sufficiently exposed to provide a base for a bond with a subsequent layer of fiber glass or the like.

In practice the heat is applied to the wrapped tubing at a sufficiently high rate to cause surface melting of the lining material without sufficient heat penetration into the lining material beneath the surface to cause the tube to become substantially out of round. In accordance with one aspect of this invention, the structural integrity of the lining material is used to insure that the pressure mentioned above is established to cause the flowing of the surface material into the openings of the fibers forming the cloth.

With the present invention an improved product is provided at greatly reduced cost. It is not necessary to use a bonding agent to cause a good lamination between the cloth and the lining material. The method is easily accomplished with uniformity and at low cost. Further, the apparatus for performing the method is low in cost and is easily maintained.

DETAILED DESCRIPTION OF THE DRAWINGS

Figure 1:
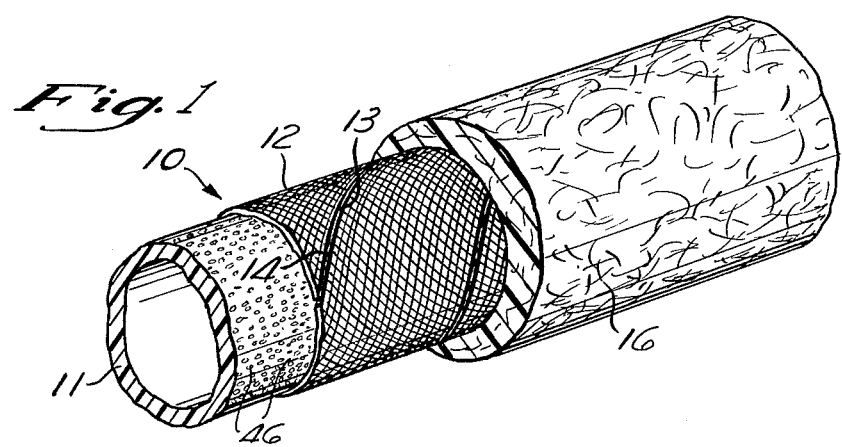
FIG. 1 is a fragmentary perspective view of a piece of tubing or pipe formed in accordance with this invention illustrating the structure in one zone including the reinforcing fiber glass, in another zone with the fiber glass removed and in still another zone with the cloth removed.

FIG. 1 illustrates a piece of pipe in accordance with the present invention. It should be understood, however, that in its broader aspects the present invention is applicable to other types of articles such as tanks and/or fittings. In FIG. 1 the pipe is illustrated with layers progressively removed to better illustrate the structure of the completed pipe. Such pipe 10 includes a lining or barrier 11 of cylindrical shape which is formed in any suitable manner such as by molding or extrusion. Usually in pipe the lining is formed by extrusion and is formed of a thermoplastic material having physical properties capable of withstanding exposure to a particular destructive material with which it is intended to be used.

As used herein the term "destructive material" is intended to include any material which cannot be used with single wall piping constructed without a liner. It is intended to include materials, for example, which are caustic, corrosive, abrasive, or which would be contaminated in use with normal piping materials. Such lining materials may, for example be polybutylene, polyethylene, polyvinyl chloride, polypropylene, polyvinylidene chloride, fluorocarbon polymers such as polyvinylidene fluoride sold under the trademark Kynar or polytetrafluoroethylene PTFE) or a copolymer of tetrafluoroethylene/hexafluoropropylene (FEP) sold under the trademark Teflon, or the like, or other thermoplastic material suitable for use with a particular destructive material.

Of particular use are FEP copolymers containing 5–20 percent by weight of hexafluoropropylene and 80–95 percent by weight of tetrafluoroethylene having a melt index number of about 0.8–12. One preferred copolymer is of 83–85 percent by weight of tetrafluoroethylene and 15–17 percent by weight hexafluoropropylene and has a melt index number of about 0.9–1.9.

Melt index number is determined according to ASTM D-1238 measured using a 5000 gram load at 272° C for 10 minutes.

Another useful fluorocarbon copolymer is of tetrafluoroethylene copolymerized with perfluoroalkylvinylether monomer in which the alkyl group has 1–5 carbon atoms. Typical monomers are perfluoropropylvinylether or perfluoroethylvinylether. These copolymers have a melt index number of about 1–17. One typical copolymer of this type is of 2–7 percent by weight of perfluoropropylvinylether and 93–98 percent by weight of tetrafluoroethylene having a melt index number of about 1–17. One preferred copolymer contains 3–4 percent by weight of perfluoropropylvinylether and 96–97 percent by weight of tetrafluoroethylene and has a melt index number of about 1.0–3.6.

Completely surrounding the outer surface of the liner or barrier 11 is a layer of cloth or fabric material 12. In the illustrated embodiment such cloth material is helically wound around the surface of the liner 11 at ambient temperature and in the absence of a bonding agent or adhesive. The material 11 consists of a long ribbon like strip of woven or knit fabric helically wound so that one edge 13 of the strip abuts without substantial gap or overlap with the opposite edge 14 of the adjacent turn of the strip. The width of the strip of fabric is less than five times the outer diameter of the liner, and in the illustrated embodiment the fabric is approximately 2 inches wide while the outer diameter of the liner is approximately 1¾ inches. In the finished piece of pipe illustrated in FIG. 1 a mechanical bond is provided between the fibers of the fabric 12 and the surface of the liner. Such bond is produced in the manner described in detail below by heating and flowing the surface of the liner 11 so that it partially embeds and embraces the various fibers forming the cloth or fabric material. In FIG. 1 the exposed portion of the surface of the lining is indicated as rough to visually indicate the manner in which the surface material flows into and around the cloth even though such portion is illustrated with the cloth removed.

The completed pipe 10 includes a layer 16 of fiber glass material which is produced by wrapping the pipe with glass mat and impregnating the mat with a typical fiber glass resin which cures to produce a layer 16 of high structural strength and rigidity. The layer 16 is bonded by the resin material to the fabric 12 and through the fabric 12 is mechanically bonded to the liner 11 so that the liner is supported even against internal collapse when the pipe is exposed to vacuum. The composite structure utilizes the liner to contain the destructive materials which are carried by the pipe, without damage, and the fiber glass layer provides the strength and rigidity to withstand pressure, vibration or other mechanical forces applied to the pipe.

With such structure there are no weld seams in the liner since the liner is formed as a homogeneous tubular element. Similarly, the fabric does not have any significant discontinuities since the edges even at 13 and 14 are mechanically bonded with the surface of the liner 11. The fiber glass also produces a homogeneous fiber glass layer 16, so that the entire wall of the composite tube is homogeneous and free of seams or other discontinuities.

Figures 4, 5:
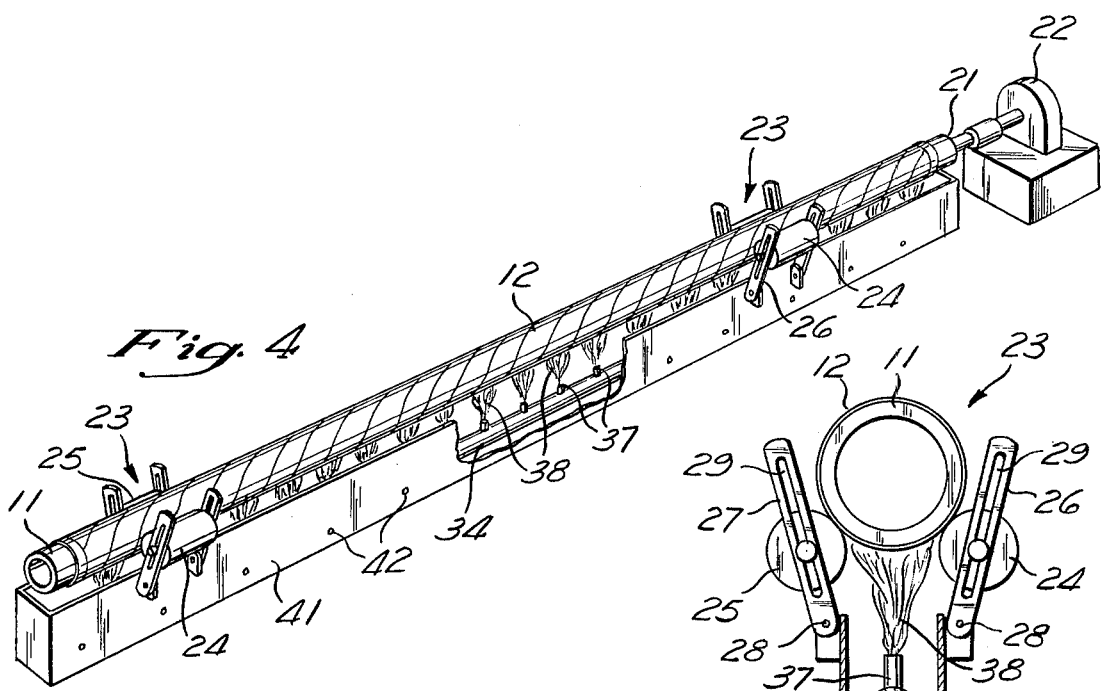
FIG. 4 is a perspective view of one form of apparatus in accordance with this invention with parts broken away for purposes of illustration; and, FIG. 5 is a cross section of the apparatus illustrated in FIG. 4.

FIGS. 2 through 5 illustrate the method and apparatus for manufacturing the pipe of FIG. 1. Preferably in such method a piece of extruded liner having a hollow cylindrical shape is connected at one end 21 to a power drive 22 which operates to rotate the liner 11 around its axis at a relatively slow speed. The liner is supported at spaced locations along its length by suitable support assemblies 23. One form of support assembly 23 is best illustrated in FIG. 5 and includes a pair of similar rollers 24 and 25 which are supported on adjustable supports 26 and 27 respectively so that they can be adjusted in or out, and up or down for proper support and positioning of the liner 11. For example, when the liner 11 is of a smaller diameter, the rollers 24 and 25 are adjusted inwardly. When it is desired to move the liner up or down, the rollers are adjusted along the length of the associated support.

The supports are preferably pivotally supported at 28 and are provided with elongated slots 29 to provide full adjustment of the roller position. It should be understood that a sufficient number of support assemblies 23 are provided along the length of the liner 11 to support the liner against significant sagging intermediate the support assemblies.

The liner 11 is helically wrapped with a strip of fabric 12 from one end to the other, either in the machine illustrated in FIG. 4, or before being installed in such machine. In wrapping the liner one end of the fabric is usually taped or otherwise fastened to one end of the liner. The liner is then rotated as the cloth is held by the operator's hand and guided with a light tension of less than 10 pounds to cause the cloth or fabric to lay smoothly along the surface of the tube in a helical pattern. As illustrated in FIG. 1 the cloth is preferably wrapped around the liner so that the edges of the cloth abut the edges of the cloth in adjacent turns so that the cloth completely encloses the liner without any substantial overlapping of the edges.

Figures 2, 3:
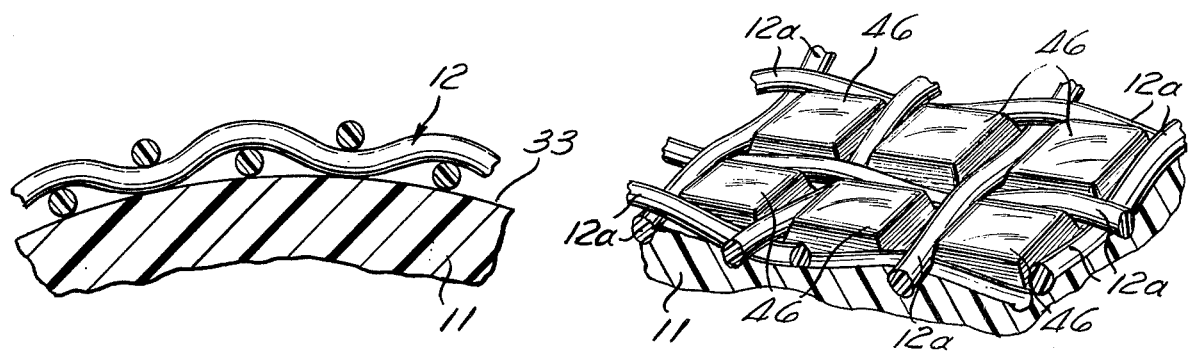
FIG. 2 is a greatly enlarged fragmentary cross section illustrating the liner tube of FIG. 1 with the cloth wrapped along the surface thereof before heating to produce the bond.
FIG. 3 is a greatly enlarged fragmentary perspective view illustrating the structure after heat is applied to produce a bond between the cloth wrapping and the lining material.

FIG. 2 is a greatly enlarged fragmentary cross section of the wrapped liner 11 before bonding of the cloth 12 to the surface of the liner. In such instances the cloth 12 merely lays against the smooth outer surface 33 of the liner 11. The cloth may be of either a woven type or may be knit type cloth. Since knit type cloth tends to stretch more easily the use of knit type cloth is preferred since it is easier to wrap smoothly over the liner, particularly when the liner has an irregular shape. In practice, the cloth should be formed of a material which will bond with the resin of the outer layer 16 and which has a coefficient of thermal expansion less than the coefficient of thermal expansion of the material forming the liner 11. In most instances the cloth is formed of glass fibers since such material has a relatively low coefficient of thermal expansion, is capable of withstanding substantial heat and bonds with resins used to form fiber glass.

After the tube is wrapped as illustrated in FIG. 4, it is rotated by the power source 22 while heat is applied to the outer surface by a burner system 34. In the illustrated embodiment, the burner system includes a pipe 36 supplied with natural gas or liquid propane gas or other suitable fuel for jets or burner elements 37 at intervals along its length. The burners 37 are spaced sufficiently close together so that a relatively continuous source of heat is provided along the length of the wrapped liner 11 by the flame 38 emitting from each of the burners 37. In this illustrated embodiment the burner system 34 is enclosed within a U-shaped shield 41 which extends up around the burner system to shield the flame against random air currents and to insure that a steady flame is provided with its heat directed against the tube. Vent openings 42 are provided along the length of the shield to admit air for good combustion.

As shown in FIG. 5, the burner system 34 provides localized heating of the rotating liner at a temperature in excess of the liner melting temperature over less than 50 percent of the outer surface area of the liner. This permits close control of the process, since the simultaneous melting and expansion does not take place too quickly and since the operator has access to all portions of the liner at the top of the machine as the liner rotates.

The burner system 34 applies heat to the rotating wrapped liner at a sufficiently high rate to cause the outer surface of the liner to be simultaneously melted and displaced radially outwardly into the fabric solely by thermal expansion of the liner without sufficient through heating of the liner material to cause the liner material to become out of round. Heat is thus supplied to the liner material at a sufficiently high rate to cause surface melting adjacent to the burners without deep melting of the liner material. In accordance with one aspect of this invention, the differential thermal expansion of the liner material and fabric material is used to produce a pressure between the melted surface liner material and the cloth which causes the liner material to flow into the fabric.

FIG. 3 illustrates the liner and fabric after heating and subsequent cooling. In such condition the lining material includes surface nodules 46 which protrude into the openings in the fabric and partially around the fibers 12a of the cloth 12. The nodules mechanically interlock with such fibers to produce a strong mechanical bond between the cloth 12 and the liner material. It is preferable therefore that the cloth be of a type providing relatively open weave so that the liner material can easily flow into the cloth to provide the bond. After the liner material is sufficiently heated, the flame is extinguished and the wrapped tube is allowed to cool so that a permanent bond is established.

With the illustrated apparatus concentrated heat is applied to only one portion of the surface and relative movement is produced between the flame and the tube to insure that heat is applied to all portions of the tube. With such apparatus there is a tendency for greater flow of lining material into the fabric in bands directly above each flame, and it may be desirable to move the liner longitudinally a short distance to insure adequate bonding along the entire length of the liner.

In the manufacture of items having irregular shapes such as fittings or other structures the wrapped liner of such irregular shape is heated locally with a hand torch or other heat source which is moved back and forth along the surface of the liner to melt the surface material and produce a bond between the wrapping and the surface of the liner.

Subsequently, after the tube has cooled, it is encased within the structure layer, which in the illustrated embodiment is a homogeneous fiber glass layer 16. Preferably, the forming of the layer 16 of fiber glass is accomplished by filament winding or by hand lay up. The resin of the layer 16, which may be polyester resin or the like, produces a bond between the fiber glass layer 16 and the fabric 12 which although partially embedded in the surface of the liner is still exposed along a major portion of the surface of the liner-fabric laminate.

The particular material used to form the liner, its thickness and its diameter determines the manner in which the apparatus should be adjusted and the method carried out. If, for example, the spacing between the flame and wrapped liner is too great, the heat will not be applied to the liner material at a sufficiently high rate to cause adequate surface melting and thermal expansion. If, on the other hand, the flames are too close to the wrapping there is a tendency for scorching to occur and relatively uneven heating. Further, the speed of rotation and the time of heating should be adjusted for the particular liner material involved. For example, Teflon melts at a temperature of about 500° to 535° F while polypropylene melts at a lower temperature on the order of 275° to 300° F. Generally, the speed of rotation of the tube should be between about one half a revolution per minute and about 20 revolutions per minute. Additionally, if the wall thickness of the liner is relatively thin so that the wrapped liner tends to sag between the supports 23, a support bar (not shown) may be inserted into the inside of the liner to prevent excessive sagging.

A Teflon tube or liner having an internal diameter on the order of 1¾ inches and a wall thickness of about 90 mills is satisfactorily bonded when rotated at 10 revolutions per minute for about 10 minutes. In such instance the burner should be spaced from the lower surface of the wrapped tube by a distance of about 3 inches, and the flame should impinge upon the surface of the wrapped tube.

In accordance with the present invention a low cost method and apparatus are provided in which it is not necessary to use separate bonding agents to adhere the glass fiber to the surface of the liner. Additionally, it is not necessary to use an expanding mandrel or high pressure inside the liner to expand the liner into the fabric, since only the simultaneous thermal expansion and melting of the liner at atmospheric pressure is used to displace the outer surface of the liner radially outwardly relative to the fabric. It should be understood that although the invention is particularly useful with liner materials which are difficult to bond chemically, it is also useful with other liner materials since it is not necessary to utilize a separate bonding agent.

Although a preferred embodiment of this invention is illustrated it is to be understood that various modifications and rearrangements may be resorted to without departing from the scope of the invention disclosed and claimed.

What is claimed is:

1. A method of forming composite hollow articles with non-collapsible liners for containing destructive materials and an outer sleeve of substantially rigid high strength material in which material forming the liner cannot be directly bonded to the material forming said sleeve, comprising the steps of selecting a preformed seamless extruded liner of thermoplastic material with an inner wall shaped to contain said destructive materials and an outer surface, applying a fabric to said outer surface of said liner material, externally applying heat to said outer surface through said fabric at a sufficiently high rate and a period of time required to melt said outer surface of said thermoplastic material without melting the portions of said thermoplastic material spaced from said surface, said application of heat causing heating without melting of said portions of said thermoplastic material spaced from said surface and causing radial expansion thereof a greater amount than said fabric thereby causing nodules of said melted outer surface to flow radially outward into openings in said fabric to partially enclose said fabric in said melted outer surface while leaving substantial portions of said fabric exposed, cooling said liner to solidify said outer surface and produce a permanent mechanical bond between said fabric and said outer surface of said liner without separate bonding agents, and thereafter enclosing said liner and fabric with said sleeve material causing it to bond to said exposed fabric without bonding to said liner material, said fabric providing substantially the entire interconnection between said liner and said sleeve and providing a sufficient connection to prevent collapse of said liner.

2. A method of forming hollow articles as set forth in claim 1, said application of fabric including winding said fabric around said liner to produce a substantially continuous layer of fabric around said liner.

3. A method of forming hollow articles as set forth in claim 1, including providing a source of heat and establishing relative movement between said source and said liner to progressively heat and melt said outer surface.

4. A method of forming hollow articles as set forth in claim 3, including supporting said liner vertically above said source of heat and moving said liner with respect to said source of heat.

5. A method of forming hollow articles as set forth in claim 3, including selecting said liner with a generally tubular shape and a longitudinal axis, and rotating said liner about said axis.

6. A method of forming hollow articles as set forth in claim 5, including forming said liner of a fluorocarbon by extrusion with a seamless cylindrical shape, and winding said fabric helically along said outer surface of said liner.

7. A method of forming hollow articles as set forth in claim 6, including selecting said liner material having a higher coefficient of thermal expansion than the material forming said fabric, the heating of said liner being the entire source of pressure between said surface of said liner and said fabric.

8. A method of forming hollow articles as set forth in claim 7, including selecting said fabric as an elongated ribbon like piece of fabric having openings between its fibers.

9. A method of forming composite tubular articles with non-collapsible fluorocarbon liners for containing destructive materials and an outer sleeve of substantially rigid high strength resin-impregnated fiber glass material in which the fluorocarbon liner cannot be directly bonded to the resin-impregnated fiber glass material comprising the steps of forming a homogeneous liner of a fluorocarbon with an inner wall to contain said destructive materials and an outer surface, applying a glass fiber fabric to said outer surface of said liner, externally applying heat to said outer surface through said fabric at a sufficiently high rate and a period of time required to melt said outer surface of said fluorocarbon without melting the portions thereof spaced from said surface, said application of heat causing heating without melting of said portions of said fluorocarbon spaced from said surface and causing radial expansion thereof a greater amount than said fabric thereby causing nodules of said melted outer surface to flow radially outward into openings in said fabric to partially enclose said fabric in said melted outer surface while leaving substantial portions of said fabric exposed, cooling said liner to solidify said outer surface and produce a permanent mechanical bond between said fabric and said outer surface of said liner without separate bonding agents, and thereafter enclosing said liner and fabric with said resin-impregnated fiber glass causing it to bond to said exposed fabric without bonding to said liner material, said fabric providing substantially the entire interconnection between said fluorocarbon and said resin-impregnated fiber glass and providing a sufficient connection to prevent collapse of said liner.

10. A method of forming tubular articles as set forth in claim 9, including forming said tubular liner by extruding a fluorocarbon copolymer having a melt index number of about 0.8-12 and being of 5-20 percent by weight of hexafluoropropylene and 80-95 percent by weight of tetrafluoroethylene.

11. A method of forming composite hollow articles with non-collapsible liners for containing destructive materials and an outer sleeve of substantially rigid high strength material in which material forming the liner cannot be directly bonded to the material forming said sleeve comprising the steps of selecting a preformed seamless liner of thermoplastic material with an inner wall shaped to contain said destructive materials and an outer surface, applying a fabric formed of fibers to said outer surface of said liner material, externally applying heat to said outer surface through said fabric at a sufficiently high rate and a period of time required to melt said outer surface of said thermoplastic material without melting the portions of said thermoplastic material spaced from said surface, said application of heat causing heating without melting of said portions of said thermoplastic material spaced from said surface and causing radial expansion thereof a greater amount than said fabric thereby causing nodules of said melted outer surface to flow radially outward into openings in said fabric to partially enclose said fabric in said melted outer surface while leaving substantial portions of said fabric exposed, cooling said liner to solidify said outer surface and produce a permanent mechanical bond between said fabric and said outer surface of said liner without separate bonding agents, and enclosing said liner and fabric with said sleeve material causing said sleeve material to bond to said exposed fabric without bonding to said liner material, said fabric providing substantially the entire interconnection between said liner and a sleeve which is bonded to said fabric and to provide a sufficient connection to prevent collapse of said liner.

* * * * *